March 25, 1969  F. OEHME  3,435,301
PRESSURE RELEASE VALVE FOR A CONTAINER
Filed May 25, 1964

INVENTOR.
Frank Oehme

United States Patent Office 3,435,301
Patented Mar. 25, 1969

3,435,301
PRESSURE RELEASE VALVE FOR A
CONTAINER
Frank Oehme, Kogevej 175, Taastrup, Denmark
Filed May 25, 1964, Ser. No. 370,133
Claims priority, application Denmark, June 26, 1963,
3,030/63
Int. Cl. H01g 9/00, 9/12; B65d 3/10
U.S. Cl. 317—230                               2 Claims

ABSTRACT OF THE DISCLOSURE

A container being closed by rolling over a cap of rubber-laminated hardpaper with a recess at its periphery. At overpressure the cap will flex and a leak will be sprung between the recess and the rolled-over edge. A successively overlapping punching out of caps by which the periphery of one cap shapes the recess of the following cap.

---

This invention relates to a pressure release valve for electrolytic capacitors and other devices housed in a container having a rolled over seal coated with an elastic material, and to a method for its manufacture.

As is known, in electrolytic capacitors it is necessary to prevent, by means of a pressure release valve, the danger of an explosion being caused by overloading. Numerous pressure release valves are already known, and they more or less satisfactorily fulfil the requirements made.

A commonly used embodiment of an electrolytic capacitor consists of an aluminium container which holds the capacitor winding and is closed by rolling over a seal coated with an elastic material, for example, a rubber plated hardpaper disc. The pressure release valve generally consists of a hole in the hardpaper disc in combination with the rubber layer. At the overloading of the capacitor, the overpressure developed will ultimately result in the rubber layer being perforated, and the overpressure being released.

Such pressure release valve suffers from various disadvantages. On one hand, the hardpaper layer is to be completely drilled and removed by milling of the hole, since otherwise the release effect would fail to set in or would not positively set in. On the other hand, the milling cutter must not catch the rubber layer and tear it up, whereby the disc would become leaky and thereby unusable.

Hence, the necessary care substantially increases the cost of production of this pressure release valve. Unusable discs are to be separated, and this further increases costs.

Another disadvantage of this embodiment of the pressure release valve is that it requires rather much space, as a consequence of which it is unusable for small seals, for example, of a diameter of less than 16 millimeters. As a result of the ever spreading miniaturisation tendency, an efficient pressure release valve is in particular required for these small capacitors.

The object of this invention is to design a seal having a pressure release valve which does not suffer from the said disadvantages, and which will not involve special costs of manufacture. According to this invention, the pressure release valve consists in the seal coated with elastic material having, at its periphery, at least one recess and/or flattening completely covered and sealed by the rolled over edge of the container.

The invention will be better understood from the following description and accompanying drawing in which.

Figure 1:
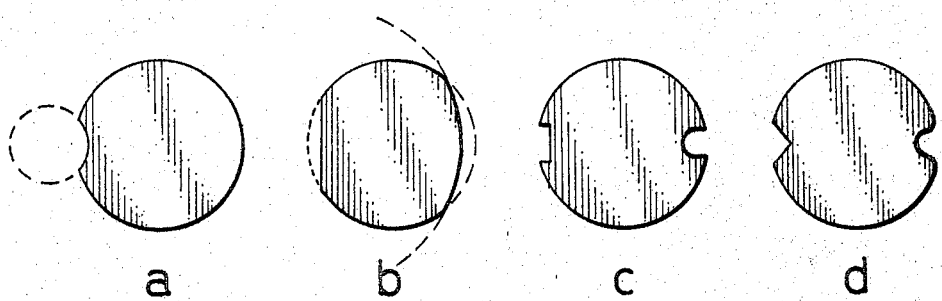
FIG. 1 shows several examples of differently shaped caps according to the invention.

Referring now to the drawing, the invention and its advantages will be apparent from the following description.

FIG. 1 shows several embodiments of seals forming the object of the invention. It is particularly easy to manufacture seals with a pressure release valve according to the example shown in FIG. 1a, in which the recess is circular, because it can be punched at no special cost at the same time as holes, not shown in the example, for the terminal leads in are punched. FIGS. 1c and 1d show seals having differently shaped recesses. FIG. 1b shows a seal having segment and sickle shaped flattenings.

Figure 4:
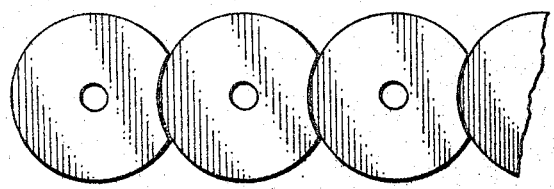
FIG. 4 illustrates the successive punching-out and the shape of caps obtained by a particularly advantageous method of manufacture according to the invention.

One particularly advantageous method of manufacturing seals having pressure release valves according to the invention, by which the seals coated with an elastic material are, in a manner known per se, successively punched out of strip of this material, consists in the strip being conveyed, between the individual punchings, over a distance shorter than the entire diameter of the seal. Through this method seals corresponding to FIG. 4 are obtained, the punching of one seal forming the recess of the next seal, and so on. The simple design of the punching tool is particularly advantageous. In addition, as a consequence of the narrow succession of the seals at the punching operation, a substantial saving of material of even up to twenty percent, will be effected.

Figure 2:
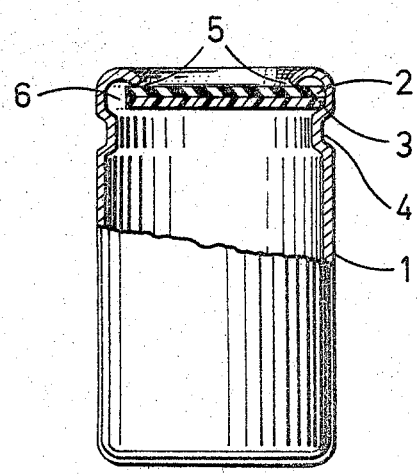
FIG. 2 shows a sectional view of a combination of a cap and a container in which the invention is embodied.
Figure 3:
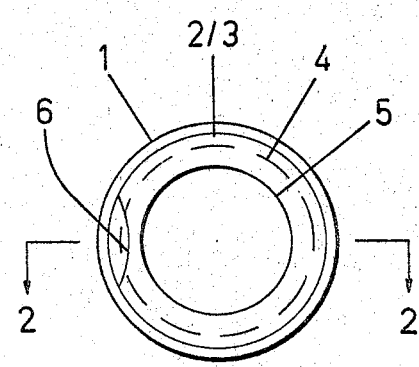
FIG. 3 shows the cap-container-combination of FIG. 2, seen from the disc-side.

The mode of operation of the pressure release valve forming the object of this invention is illustrated by the example shown in FIGS. 2 and 3 which show a container 1 having a seal cap 3 coated with an elastic material 2; the seal cap 3 is supported by the ridge 4, and seals the container at the rolled edge over edge 5. The recess 6 is completely covered and sealed by the rolled over edge 5. At a certain overpressure, a leak will be sprung between the recess 6 and the rolled over edge 5, and the overpressure will be released even before the seal is burst from the container.

The pressure release valve forming the object of this invention can be designed to fit any diameter of seal, in particular also small diameters, for example, 10 millimetres; its manufacture requires no extra operation, and it will function reliably if suitably designed. As a rule, one recess in or flattening of the seal will be sufficient. However, in special instances, several recesses and/or flattenings distributed over the periphery of the seal may be advantageous, for example, in the case of a large clearance between the seal and the container, in which event the recesses or flattenings must only be less deep to obtain positive tightness. According to the location of such seal, one or the other recess or flattening will lie nearest the rolled over edge and as the first release the valve action in the case of overpressure.

This present invention is not limited to circular seals, but may also in a similar manner be applied to differently shaped seals, for example, oval seals. Nor is this invention limited to electrolytic capacitors; it also relates to other devices housed in a container having a rolled over seal coated with an elastic material in which valve action might be desirable.

What I claim is:

1. A pressure release valve for a container having a rolled-over edge and being hermetically sealed by means of this rolled-over edge and a cap of rigid-like material coated with an elastic material, said cap having, at its periphery, at least one recess, being completely covered and sealed by said rolled-over edge of said container.

2. A pressure release valve as claimed in claim 1, said recess of said cap being circularly shaped.

References Cited

UNITED STATES PATENTS

| 1,669,623 | 5/1928 | Messer | 83—50 |
| 1,836,220 | 12/1931 | Bloom | 317—230 |
| 1,959,415 | 5/1934 | Engle et al. | 317—230 |
| 2,847,622 | 8/1958 | Bugel | 317—230 |

FOREIGN PATENTS 605,077 7/1948 Great Britain.

JAMES D. KALLAM, *Primary Examiner.*

U.S. Cl. X.R.

220—24; 229—5.5